United States Patent
Chelminski et al.

(10) Patent No.: US 6,612,396 B1
(45) Date of Patent: Sep. 2, 2003

(54) CONTROLLED-POLARIZATION MARINE SEISMIC SHEAR-WAVE SOURCE

(75) Inventors: Paul Chelminski, Norwalk, CT (US); Rodney A. E. Humphreys, Silsoe (GB)

(73) Assignee: Bolt Technology Corporation, Norwalk, CT (US)

( * ) Notice: Subject to any disclaimer, the term of this patent is extended or adjusted under 35 U.S.C. 154(b) by 0 days.

(21) Appl. No.: 09/677,141

(22) Filed: Oct. 2, 2000

(51) Int. Cl.$^7$ ................................................ G01V 1/38
(52) U.S. Cl. .................. 181/113; 181/118; 181/120; 367/75
(58) Field of Search ................................. 181/113, 114, 181/115, 116, 117, 118, 120; 367/75

(56) References Cited

U.S. PATENT DOCUMENTS

| | | | | |
|---|---|---|---|---|
| 3,482,646 A | * | 12/1969 | Brown et al. ............... | 181/118 |
| 4,219,096 A | * | 8/1980 | Airhart ....................... | 181/113 |
| 4,705,137 A | * | 11/1987 | Fair ........................... | 11/120 |
| 5,000,285 A | * | 3/1991 | Airhart ....................... | 181/113 |
| 5,128,906 A | * | 7/1992 | Cole ........................... | 181/120 |

* cited by examiner

Primary Examiner—Khanh Dang

(74) Attorney, Agent, or Firm—G. Kendall Parmelee (57) ABSTRACT

Controlled-polarization marine seismic shear-wave source has a base suitable for positioning on a seafloor, beneath a water body. Twin water-blast tubes (seismic-impulse-generation thrusters) are mounted on the base, aimed upwardly, outwardly in opposite directions at equal acute angles β relative to the base. These blast tubes are positioned symmetrically on opposite sides of vertical centerline CL of the source. When submerged, water enters open mouths at upper ends of the tubes. The base has multiple downwardly projecting blade-like teeth for penetrating into the seafloor. Firing a compressed-air discharger mounted in a lower end of a water-blast tube hurls a powerful slug of water upwardly along the tube, producing a powerful reaction impulse acting downwardly generally parallel with the tube axis. These blade-like teeth, engaging with seafloor material, couple into the seafloor horizontal force components of reaction impulses, thereby propagating simultaneously into the body of the seafloor horizontally-polarized shear waves (SH-Waves) and vertically-polarized shear waves (SV-Waves). Firing one blast tube produces SH-Waves and SV-Waves of first polarities. Firing the other tube produces SH-Waves and SV-Waves of second polarities, respectively opposite to the first polarities. Both tubes are fired simultaneously for propagating compressional P-Waves. While lifting slightly by a swivel cable, azimuthal orientations of the source and resulting shear-wave orientations are controllably changeable by simultaneously firing pneumatic thrusters aimed outwardly from diagonally opposite corners of the base.

23 Claims, 5 Drawing Sheets

BASE PLATE USING REMOVABLE TEETH

CONTROLLED-POLARIZATION MARINE SEISMIC SHEAR-WAVE SOURCE

FIELD OF THE INVENTION

This invention is in the field of generating and transmitting into the earth seismic energy waves. More particularly the invention relates to a controlled-polarization marine seismic shear-wave source having a base adapted to be positioned on a seafloor, i.e., on the floor of a body of water, with controllable azimuthal orientation for predetermining the polarization-orientation of shear waves being generated and propagated into the body of the seafloor material.

BACKGROUND

Seismic shear waves are transverse elastic waves in which particle motion is perpendicular to the direction of propagation. Horizontally polarized seismic shear waves (SH-Waves) are particularly useful in subsurface exploration and may be generated by subjecting a localized area of a-surface of the earth (seafloor in this instance) to impulses which have a horizontal component of force perpendicular to the direction of propagation of the SH-Waves.

Also, vertically polarized seismic shear waves (SV-Waves) have utility in subsurface exploration and may be generated by subjecting a localized area of a surface of the earth (seafloor) to impulses which have a horizontal component of force in line with the direction of propagation of the SV-Waves.

In addition to generating SV-Waves, subjecting a localized area of a surface of the earth (seafloor) to impulses having a vertical component of force also will generate compressional seismic waves (P-Waves). P-Waves are waves wherein particle motion occurs in the direction of propagation.

It is not possible to transmit seismic shear waves (either SH-Waves or SV-Waves) within a body of water, because water does not provide nor carry shear elastic force. A water body will propagate compressional seismic waves (P-Waves).

SH-Waves, SV-Waves and P-Waves described herein are "body waves" which propagate within a body of seafloor material and are to be distinguished from "surface waves" which propagate along a surface of the seafloor.

SUMMARY OF THE DISCLOSURE

This controlled-polarization marine seismic shear-wave source is capable of generating and propagating down into the seafloor SH-Waves, SV-Waves and P-Waves.

The controlled-polarization marine seismic shear-wave source shown and described herein is adapted to be positioned on a seafloor, i.e., the floor of a body of water, in controlled azimuthal orientation for establishing the polarization-orientation of shear waves being generated and propagated into the body of the seafloor material.

In other words, the azimuthal orientation of the base of the source can be controllably changed by suitable pneumatic thrusters as illustrated and described. Moreover, azimuthal orientation of the base is shown being sensed by a gyroscopic compass for transmitting electrical orientation data signals to a ship by a suitable umbilical cable, or by remote acoustic (sonar) transmission.

Also, azimuthal orientation of the base of the marine seismic shear-wave source can be determined from a ship by using sonar transponders suitably positioned on the base.

The marine seismic shear-wave source embodying the invention includes a suitably robust base adapted to be positioned on a seafloor. This base has downwardly-projecting blade-like teeth elements protruding downwardly therefrom for penetrating into the seafloor surface sediments in mechanical engagement with such seafloor material for augmenting coupling with the seafloor of horizontal force components generated by the shear-wave source.

Mounted on the base is at least one (and preferably two) elongated water-discharge tube(s) aimed upwardly from the base at an acute angle relative to the base. An open discharge mouth is at the upper end of a discharge tube. The open mouth allows water to enter into and fill the tube when the source has been submerged into a body of water. A quick-firing, compressed-air discharger shown as a marine airgun is mounted in a lower portion of the tube. Upon firing a charge of compressed air from this discharger, a slug of water is blasted upwardly along the tube toward its mouth with water surging out of the tube's mouth, thereby generating a powerful reaction impulse acting in the direction opposite from the direction in which the slug of water is being blasted. This powerful reaction impulse is applied by the base to the seafloor thereby generating SH-Waves and SV-Waves in the seafloor having predetermined polarizations and which propagate in predetermined directions through the body of the seafloor. Also, P-Waves are generated and propagated down into the seafloor body.

In order to control azimuthal orientation of the marine seismic shear-wave source on the seafloor for propagating SH-Waves of predetermined polarization and having a predetermined and known direction of propagation, two pneumatic thrusters are shown mounted on the base of the source. These thrusters are aimed outwardly from the source in opposite directions. They are positioned away from the center of the base so that simultaneous actuation of these two thrusters applies a torque to the base for changing its azimuthal orientation. A preferred way in which to accomplish such change in azimuthal orientation is to use a lifting sling connected to the base of the source. This sling is operated from a ship for raising the base up away from significant engagement with the seafloor. After thus lifting the source, the pneumatic thrusters are actuated for turning the azimuthal orientation of the source while it is supported away from significant contact with the seafloor by the lifting sling.

A swivel is shown provided in a lifting cable line connected to the sling for facilitating turning of azimuthal orientation of the source while it is being supported by the sling and lifting cable.

A gyro compass is shown mounted on the source for providing electric signals to the ship indicating azimuthal orientation of the source. Also, sonar transponders are shown mounted on the base for use in determining azimuthal orientation of the shear-wave source.

In the preferred embodiment of the controlled-polarization marine seismic shear-wave source as shown, its base has a twin pair of elongated water-discharge tubes aimed upwardly and outwardly at equal angles from a vertical centerline.

Thus, a side elevational view of this source is characterized by a symmetrical arrangement of the two water-discharge tubes each extending diagonally upwardly and defining a V-shape between them. The vertical centerline of the source bisects the vertex of this V-shape configuration.

Among advantages of having the twin pair of symmetrically positioned, water-discharge blast tubes are those arising from the capability of alternately discharging them for producing sequences of SH-Waves of alternately opposite polarity.

In addition to the downwardly-projecting blade-teeth elements, the base of the source has a multiplicity of apertures therein for allowing water to flow vertically through the base as it is being lowered through the water suspended by its sling and cable line from a surface ship. These water-flow apertures serve to avoid significant sideways "kiting" or "sailing" through the water as the source is being lowered.

Various other patentably novel features, aspects, advantages and objectives of the controlled-polarization marine seismic shear-wave source embodying the invention will be pointed out and described in the specification with reference to the accompanying drawings and/or will become understood by those skilled in the art from their consideration of the specification and drawings.

The terms "horizontal" and "vertical" are used herein for illustrative convenience in making reference to various Figures. These terms "horizontal" and "vertical" are not intended to be restrictive, because in use the base of the source may be seated down in a seismic exploration or surveying site at a localized region of a seafloor which happens to be inclined relative to a geographically horizontal plane at the site of operation. In such a situation a "vertical symmetrical centerline CL" (FIG. 2) of the source will be tipped relative to geographical vertical and the base seated down upon such inclined local region correspondingly will be slanted relative to geographic horizontal.

BRIEF DESCRIPTION OF THE DRAWINGS

The invention, together with further objectives, features, advantages and aspects thereof, will be more clearly understood from the following detailed description considered in conjunction with the accompanying drawings. Like reference numerals indicate like elements or like components throughout the different views.

The accompanying drawings, which are referenced to and which we thereby consider as being an integral part of the specification, illustrate a presently preferred embodiment and a presently preferred modified embodiment of the invention. The drawings, together with the general description set forth above and the detailed description of the preferred and modified embodiments set forth below, serve to explain the principles of the invention. In these drawings:

FIG. 5 is a top plan view of the marine shear-wave source shown in FIGS. 1 and 2.

DETAILED DESCRIPTION OF PREFERRED EMBODIMENTS OF THE INVENTION

Figure 1:
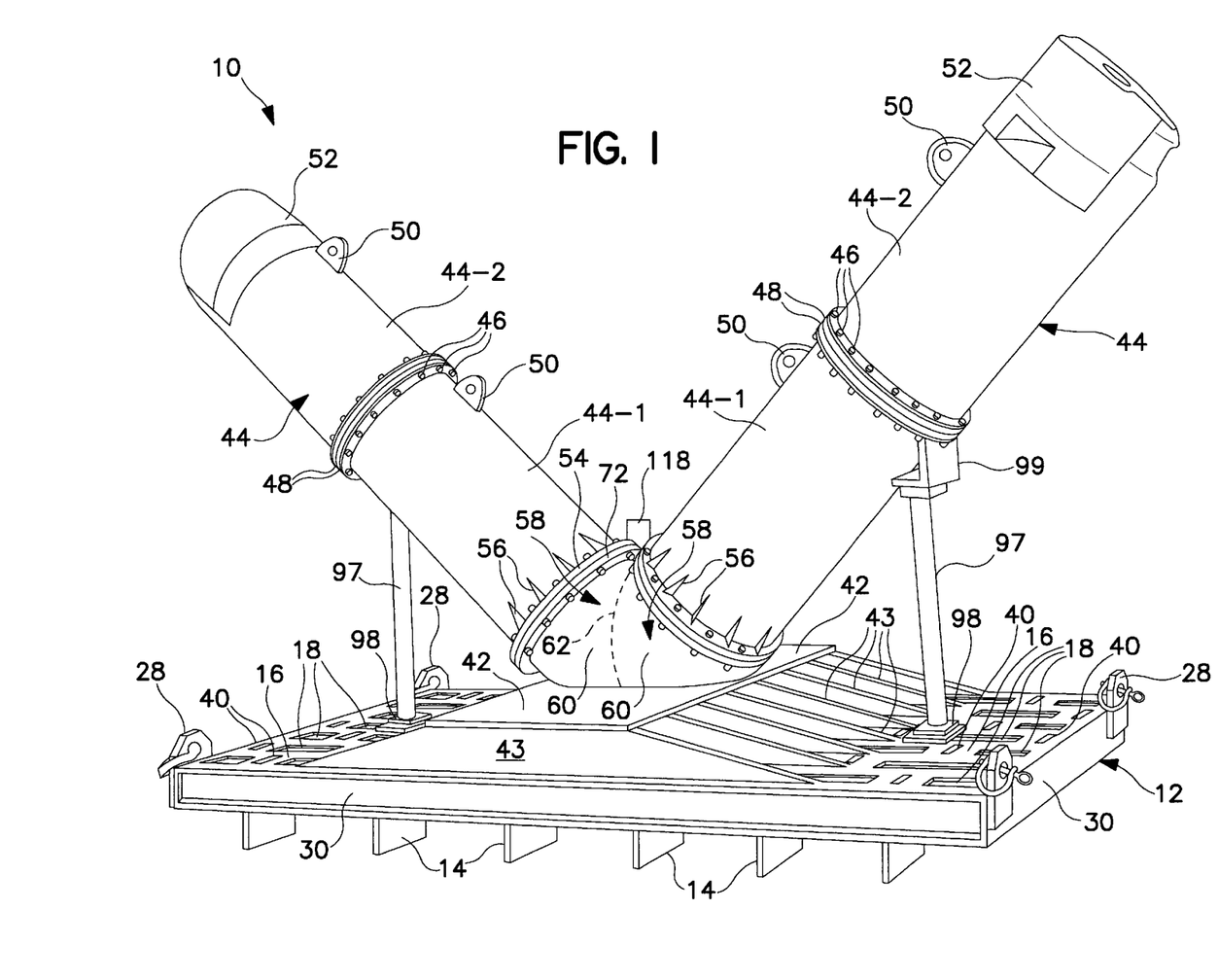
FIG. 1 is a perspective view of a controlled-polarization marine seismic shear-wave source embodying the invention. This shear-wave source includes a twin pair of discharge tubes symmetrically mounted on a suitably robust, strong base and aimed upwardly diagonally in a V-shape configuration. A multiplicity of sediment-penetrating blade-like teeth are shown protruding downwardly below the base.
Figure 2:
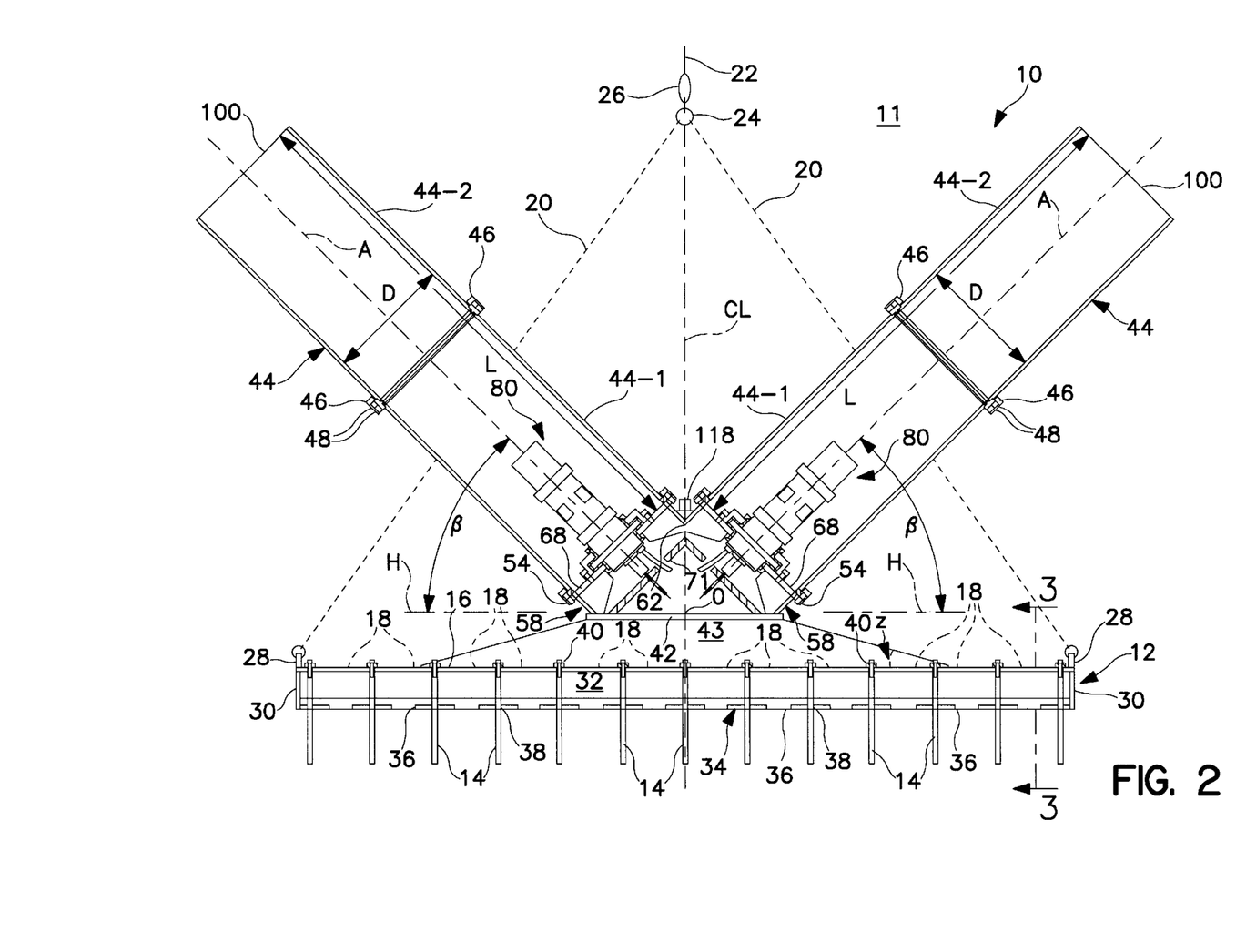
FIG. 2 is a side elevational sectional view of the marine shear-source shown in FIG. 1 illustrating an arrangement of an array of the downwardly-projecting, sediment-penetrating blade-like teeth.
Figure 3:
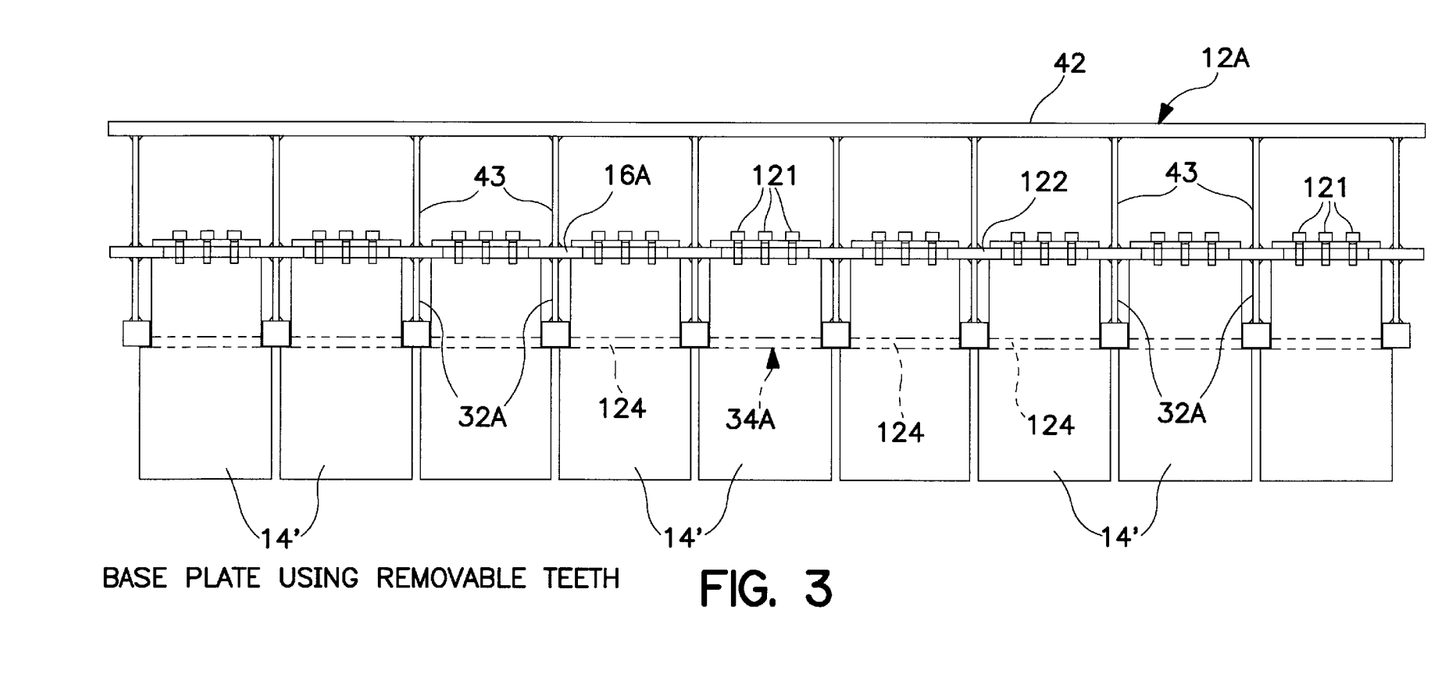
FIG. 3 is an elevational sectional view taken along the plane 3—3 in FIG. 2 looking toward the left in FIG. 2 for showing a modified embodiment of the invention wherein the blade-like teeth are removably mounted on a modified base structure. The components shown in FIG. 3 are enlarged by slightly more than twice compared with similar components as seen in FIG. 2.
Figure 4:
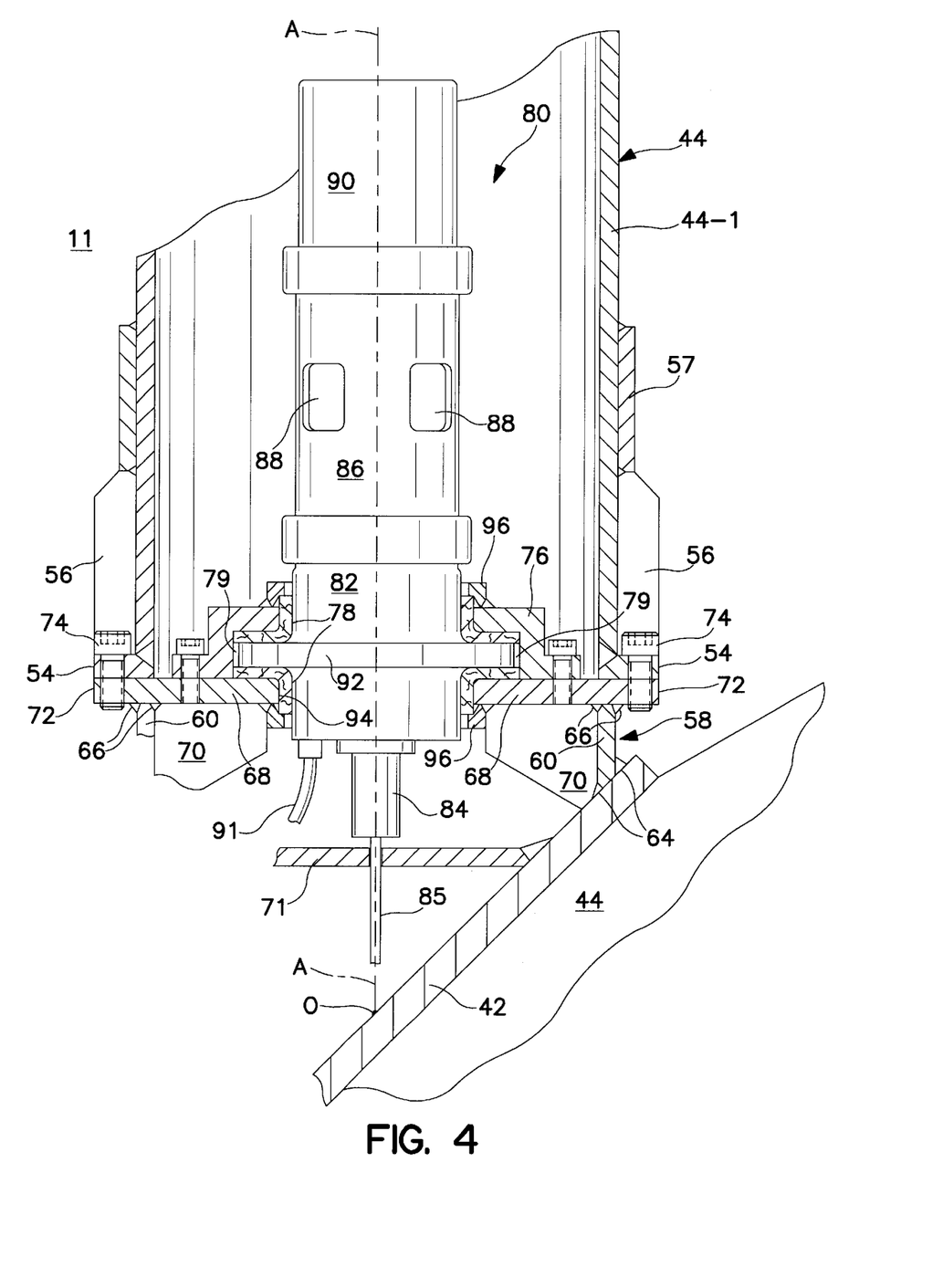
FIG. 4 is an enlarged partial elevational sectional view of a lower portion of one of the elongated, water-discharge tubes showing a long-life marine seismic airgun mounted therein serving as a pneumatic discharger for blasting water upwardly out of the tube.
Figure 5:
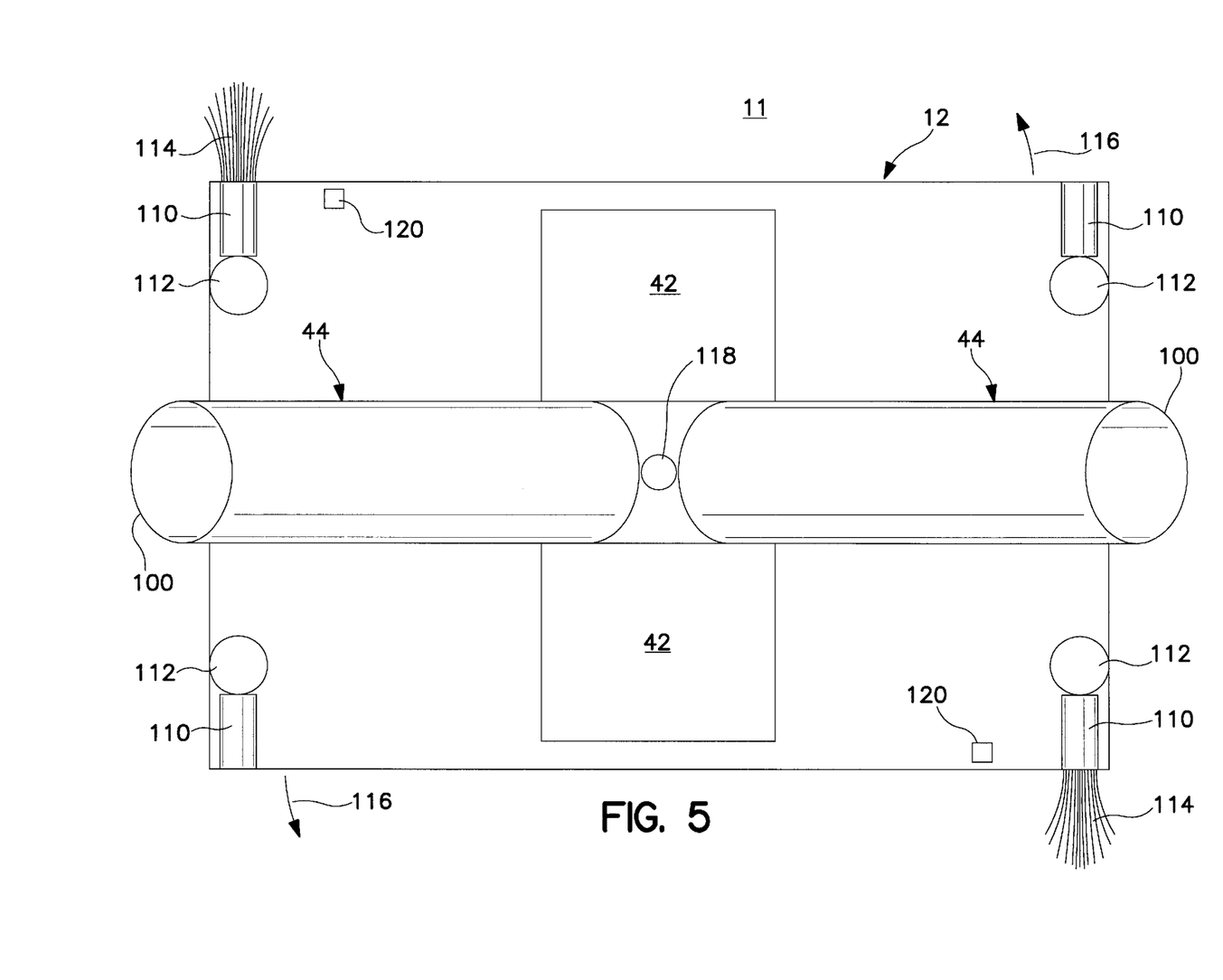
FIG. 5 shows simultaneous actuation of two pneumatic-discharge thrusters mounted near diagonally opposite corners of the base plate. These thrusters may be used to reorient azimuthal orientation of the whole shear-wave source.

The best mode for carrying out the invention is shown in FIG. 1 with reference to FIGS. 2, 4 and 5. FIG. 3 shows a modified embodiment of this best mode wherein blade teeth are conveniently removable and replaceable. FIG. 1 shows a controlled-polarization marine seismic shear-wave source, generally indicated at 10. This source is adapted to be lowered into a body of water 11 (FIGS. 2, 4 and 5), for example such as a sea, pond, lake, river, estuary, bay, channel, etc. It includes a strong, robust base structure 12 having a multiplicity of downwardly projecting blade-like teeth 14 for augmenting mechanical coupling of horizontal components of force with a seafloor below the body of water 11 where source 10 has been positioned.

The base structure 12 shown in FIGS. 1 and 2 is rectangular seen in plan view in FIG. 5 constructed of suitable structural steel. The base includes a rectangular top plate 16 having a plurality of anti-kiting, i.e., anti-sailing, apertures 18. As shown in FIG. 1, these anti-kiting apertures are elongated, extending lengthwise relative to length of rectangular base 12, and they are staggered in their respective positions in top plate 16. These apertures 18 allow water to flow vertically through the base as the source 10 is being lowered through the water from a surface ship by means of a sling 20 and lifting cable 22 for preventing significant sideways kiting (sailing) of the source 10 through the water as the source is being lowered. These anti-kiting apertures thereby enable the source to be lowered substantially vertically to an intended location on a seafloor. The sling as shown comprises four lengths of steel cable or chains extending diagonally downwardly from a suitable common fitting 24, such as a ring, connected by a suitable swivel 26 to lifting cable 22. Lower ends of the four sling lines 20 are shown in FIG. 2 connected by shackles to pad eyes 28 welded to respective corners of the base structure 12.

The sectional view seen in FIG. 2 is taken through the lengthwise centerline of the base structure 12. There are no apertures 18 along this lengthwise centerline seen in FIG. 2. Thus, for clarity of illustration, twelve nearby apertures 18 located in the half of the base structure behind this sectional view are indicated by dashed lead lines and dashed outlines.

A strong perimeter frame 30 extends around the rectangular base 12, and there are eight spaced, parallel, stiffening beams 32 (only one beam is seen in FIG. 2) extending lengthwise in the base structure welded onto the lower surface of top plate 16. These beams 32 are positioned between respective rows of anti-kiting apertures 18 and are located above a bottom plate 34 which also has anti-kiting apertures 36. This rectangular base structure 12 shown in FIGS. 1, 2, 3 and 5 has a length in a range between about 130 inches (about 330 cm) and about 150 inches (about 380 cm), and as seen in these Figures has a length of about 141 inches (about 358 cm). The rectangular base structure 12 as shown has a width in a range of about 90 inches (about 230 cm) to about 100 inches (about 250 cm), and as seen has a width of about 96 inches (about 244 cm).

Blade teeth 14 extend down through tightly fitting slots 38 in bottom plate 34. The upper end of each tooth is rigidly secured to a suitably stiff durable top plate 16, for example as shown in FIG. 1, by an assembly 40 of a top strap with triple machine screws extending down through the strap and through top plate 16 and threaded into upper ends of the blade teeth 14 as shown in FIG. 2. It is to be noted that blade teeth 14 are spaced apart, being arranged in parallel rows extending transversely of the rectangular base. Their surface areas are parallel with each other in their respective rows. Blade teeth in alternate rows are positioned in staggered relationship, as is indicated by alternate sectioning and outlining of the teeth seen in edge view in thirteen rows in FIG. 2. Thus, in FIG. 1 a viewer sees only six blade teeth 14, which are those teeth positioned at the ends of the alternate six rows in FIG. 2 identified by sectioning of blade teeth.

Twin water-blast barrel tubes 44 (seismic-impulse-generation thrusters) are shown aimed upwardly and outwardly at equal acute angles β (FIG. 2) relative to a horizontal plane H of a blast-tube mounting plate 42. These blast tubes 44 are positioned symmetrically on opposite sides of a vertical centerline CL of the source 10. Mounting plate 42 is a centrally located, strong, thick, horizontal, transversely extending rectangular plate, for example being about 1.0 inch (about 2.5 cm) thick, with its length extending transversely across the full width of base structure 12 and with its own width, as seen edgewise in FIG. 2, being about 36 inches (about 92 cms).

Mounting plate 42 is shown in FIGS. 1 and 2 welded onto upper edges of eight spaced, parallel, gusset braces 43 which are welded onto top plate 16. These parallel gusset braces 43 extend lengthwise of the base 12 and are aligned respectively directly above the eight parallel stiffening beams 32 (FIG. 2) welded to the lower surface of top plate 16. These gusset braces, for example have a height of about 8 inches (about 20 cms) and preferably extend at least about 50% of the overall length of base structure 12. As shown in FIGS. 1 and 2, gusset braces 43 extend, for example about 80 inches (about 203 cms), which is about 56% of overall length of base 12. Their triangular ends (FIG. 2) are tapered at an angle "z" shown, for example, as about 15°.

Water-blast tubes, i.e., seismic-impulse-generation thrusters, 44 are circular cylindrical tubes each having an axis "A" and an inner diameter (I.D.) "D" in a range of about 12 to about 24 inches (about 30 cms to about 60 cms). In the source 10, for example, D is shown as about 19 inches (about 50 cms). These blast tubes 44 are shown constructed of lower and upper axially-aligned tube sections 44-1 and 44-2. These tube sections are axially connected by a ring of bolts 46 passed through mating reinforced connection flanges 48.

As shown in FIG. 1, pad eyes 50 are welded onto the upper surface of lower and upper tube sections 44-1 and 44-2. These pad eyes 50 are positioned near an upper end of each tube section for convenience in supporting it by a hook and cable line from a lift crane, while these tube sections are being assembled. During storage on shipboard or on land, the mouth of each tube is covered by a removable, resilient, protective, skirted cap 52 snugly fitting over the upper end (mouth) of each upper tube section 44-2.

Downward extensions (not shown) of the axes A of blast tubes 44 meet at an alignment point "O", i.e., at an origin, which is located at a point where the centerline CL of seismic energy source 12 passes through the mounting plate 42. Lower ends of lower tube sections 44-1 are welded to mounting flanges 54 which are strengthened by reinforcing gussets 56 (FIG. 4) welded to the flange 54 and also welded to the outside of tube sections 44-1. A strengthening band 57 is shown in FIG. 4 encircling the lower tube section 44-1 opposite discharge ports 88 of an airgun 80. Alternatively, the tube wall of lower section 44-1 is suitably thicker such that an encircling band 57 is not used.

To mount blast tubes 44 removably and securely onto mounting plate 42 and to provide a removable closure for the lower end of each lower tube section 44-1, as is shown enlarged in FIG. 4, there is a pedestal assembly 58 for each blast tube. Each pedestal assembly 58 (Please see also FIG. 1.) comprises a truncated circular cylindrical pedestal wall 60 concentric with axis A and aligned with the wall of tube section 44-1. Each pedestal wall 60 is welded to its twin pedestal wall 60 along a central seam 62. This welded seam 62 is located in a plane aligned with centerline CL; this plane of seam 62 extends transversely of the base 12. Each pedestal wall 60 is welded at 64 to mounting plate 42 and is welded at 66 to an annular tube-end wall 68 of blast tube 44. A plurality of stiffening gussets 70 are welded to mounting plate 42, to pedestal wall 60 and to annular tube-end wall 68. A strong plate member 71 extends perpendicular to axis A and is welded to mounting plate 42, to pedestal wall 60 and to its twin plate member 71.

The tube-mounting flange 54 is removably secured to a rim 72 of annular tube-end wall 68 by a ring of machine screws 74 threaded into sockets in the rim 72. A pneumatic blaster 80, shown for example in FIG. 4 as a marine air gun manufactured and sold by the Assignee of the present patent application and of the invention disclosed herein, is removably mounted in shock-absorbing relation onto annular tube-end wall 68. This air gun blaster 80 is shown in FIG. 4 having an encircling flange 92 secured to tube-end wall 68 by a clamp ring 76 and a pair of resilient, annular, squishy, shock-absorbing elements 78, for example made of suitable polyurethane elastomer. There is annular clearance 79 for allowing the shock-absorbing elements 78 to squish.

The air gun 80, as is known in the art, has an operating chamber 82 with a solenoid-type firing valve 84 mounted onto the operating chamber. There is a main housing 86 for example, having four discharge ports 88 (only two are seen in FIGS. 2 and 4). A firing chamber 90 contains a charge of compressed air, for example having a volume in a range from about 100 cubic inches (cu. in.) to about 400 cu. in. (about 1,635 cubic cms. to about 6,550 cu. cms.). The pressure of the compressed air in firing chamber 90 is preferred to be at least about 2,000 psi above hydrostatic pressure of ambient water 11 at the depth of submergence of the SH-Wave source 10. For example, this air gun blaster 80 is shown as a Model 1500LL Long Life Air Gun having a firing chamber volume of about 300 cubic inches (about 4,920 cu. cms.) manufactured and sold by Assignee.

The air gun 80 is adapted for mounting in the blast tube 44 by welding an encircling annular flange 92 to the operating chamber 82. This flange 92 is clamped between the shock-absorbers 78. A lower end of operating chamber 82 extends down through a large central opening 94 in the annular tube-end wall 68. For retaining shock-absorbers 78 in their respective positions encircling chamber 82 and extending radially outwardly above and below flange 92, there are retainers 96 welded to tube-end wall 68 near its central opening 94 and welded to an inner rim of clamp ring 76.

Each airgun 80 is supplied with compressed air through a high-pressure hose line 91 (FIG. 4) as well known in the art. An umbilical cable (not shown) of a type well known in marine and borehole seismic operations extends along and is suitably attached to lifting cable 22 for connecting seismic source 10 to a surface vessel or barge and provides necessary electrical and pneumatic connections.

Upon triggering operation of firing valve 84 through a firing cable line 85, the charge of compressed air contained in firing chamber 90 blasts out through ports 88 and hurls a powerful slug of water upwardly out of the mouth 100 of the tube 44. A powerful reaction impulse thrusts downwardly in an axial direction opposite from the direction in which the slug of water is being hurled upwardly along tube 44. This powerful reaction impulse thrusts downwardly, directed generally parallel with axis A toward mounting plate 42. This reaction impulse is applied by base 12 to the localized area of the seafloor located beneath the base. The blade teeth 14 augment coupling with the seafloor of horizontal force components of the powerful reaction impulse, thereby generating and propagating into the body of the seafloor SH-Waves and SV-Waves whose two directions of propagation are perpendicular and parallel (respectively) to the horizontal force component of the reaction impulse. Thus, propagation of the SH-Waves and SV-Waves occurs in two orthogonal directions, one parallel with and one in line with planes of face areas of blade teeth 14. In other words, for a viewer looking at FIG. 2, the two directions of propagation of the SH-Waves and SV-Waves are directly in line with and perpendicular to a plane encompassing the viewer and the source.

Polarization of these SH-Waves is parallel with the horizontal component of force, i.e., is parallel with a plane containing centerline CL and axis A.

It is important to note:—For simultaneously generating and simultaneously propagating into the body of the seafloor SH-Waves and SV-Waves of first predetermined polarities, one of the blast tubes 44 is fired. Then, for simultaneously generating and simultaneously propagating into the body of the seafloor SH-Waves and SV-Waves of second predetermined polarities, each respectively opposite to the first predetermined polarities, the other of the blast tubes 44 is fired. Thus, for providing a sequence of:—simultaneous SH-Waves and SV-Waves of first predetermined polarities alternating with simultaneous SH-Waves and SV-Waves of second predetermined polarities each respectively opposite to the first predetermined polarities, the two blast tubes 44 are alternately fired, and they are not simultaneously fired.

Also, it is important to note:—for generating P-Waves, the two blast tubes 44 are fired simultaneously.

For clarity of illustration in sectional view (FIG. 2), a few of the detailed elements described with reference to perspective view FIG. 1 are not shown in FIG. 2.

In FIG. 2 the angle $\beta$ between horizontal plane H and an axis A of a blast tube 44 are both shown as about 45°. By decreasing both angles $\beta$, horizontal force components are increased, but vertical components are decreased. Conversely, by increasing angles $\beta$, vertical force components are increased, but horizontal components are decreased. In our present view, it does not appear advisable to decrease angles $\beta$ below about 30° nor to increase angle $\beta$ above about 60°.

To help support the inclined blast tubes 44, there are vertical steel struts 97 (FIG. 1) extending between the top base plate 16 and the upper end of the lower tube section 44-1. The lower ends of these struts 97 are welded to suitable load-distributing mounts 98 which are welded to base plate 16. Upper ends of these struts are welded to saddles 99 positioned immediately below connection flanges 48 on lower tube sections 44-1.

The blast tubes 44 each have the same overall length "L" from tube-end wall 68 up to the mouth 100, for example being in a range of about 70 inches to about 105 inches (about 175 cms to about 270 cms). In FIG. 2 as shown length L is about 97 inches (about 245 cms).

In order to change and control azimuthal orientation of base 12, four pneumatic thrusters 110 are shown mounted near respective corners of base 12. These thrusters are aimed outwardly generally perpendicular to the length of the base 12. Adjacent to these thrusters are mounted respective containers 112 which are charged with pressurized air fed down through a high pressure hose line (not shown) in the umbilical cable previously referred to. An electrically-controlled valve is used to release compressed air from a container 112 through its associated thruster 110. These valves are individually actuated through electrical lines in the umbilical cable.

To change azimuthal orientation of source 12, it is lifted sufficiently away from the seafloor such that simultaneous discharge 114 (FIG. 5) of two diagonally opposite thrusters 110 will change azimuthal orientation as indicated by curved arrows 116. A gyro compass 118 is shown mounted in shock-absorbing relationship between the blast tubes 44. Through an electrical line (not shown) this gyro compass suitably signals the azimuthal orientation of the base 12.

Also, FIG. 5 shows two sonic transponders 120 mounted near diagonally opposite corners of the base 12. Time differences between sonic responses received from these transponders by a remote sensor are used by a surface vessel or barge to verify or check on azimuthal orientation of the base 12.

In the modified embodiment of base 12A shown in FIG. 3, conveniently removable and replaceable blade teeth 14' are mounted by machine screws 121 to a top plate 16A welded to gussets 43 welded to mounting plate 42. These blade teeth 14' are captured in snugly fitting slots 124 (shown dashed) in a bottom plate 34A which is welded to stiffening ribs 32A. Suitable anti-skating apertures (not shown) are provided in the base structure.

Since other changes and modifications varied to fit particular operating requirements and environments will be recognized by those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. A marine shear-wave source comprising:
   a base for positioning on a seabed;
   said base having a plurality of downwardly-projecting elements protruding downwardly therefrom for penetrating into the seabed for engaging the seabed;
   said base having mounted thereon at least one elongated discharge tube aimed upwardly from the base;
   said tube being aimed upwardly from the base at an acute angle;
   said tube having an open discharge mouth at its upper end;
   said discharge mouth being open for water freely to enter said tube for filling said tube with water when said source is submerged into a body of water; and
   at least one quick-firing compressed-air discharger mounted in a lower portion of said discharge tube for blasting water upwardly through said tube and out of said open discharge mouth upon firing of said compressed-air discharger for generating and propagating seismic shear waves into the body of the seabed.

2. A marine shear-wave source claimed in claim 1, wherein:

said downwardly-projecting elements protruding downwardly from said base for penetrating into the seabed are blade-like teeth, for frictional coupling.

3. A marine shear-wave source claimed in claim 2, wherein:

said blade-like teeth are removably mounted on said base.

4. A marine shear-wave source claimed in claim 1, further comprising:

at least one pneumatic thruster mounted on said base and being aimed outwardly from said base; and said pneumatic thruster being positioned away from a center of said base for changing azimuthal orientation of said base by actuating said pneumatic thruster.

5. A marine shear-wave source claimed in claim 4, further comprising:

a lifting sling connected to said base for lifting said source;

said lifting sling having a swivel therein; and said swivel enabling azimuthal orientation of said base to be changed when said lifting sling is supporting said base away from significant engagement with the seabed, whereby actuating said pneumatic thruster changes the azimuthal orientation of said base when said lifting sling is supporting said base away from significant engagement with the seabed.

6. A marine shear-wave source claimed in claim 4, wherein:

a plurality of blade-like teeth are mounted on said base in generally spaced parallel relationship; and said pneumatic thruster is aimed in a direction generally parallel with said blade-like teeth.

7. A marine seismic shear-wave source comprising:

a base for positioning down onto a seafloor;

said base defining a reference plane "H";

said base having a plurality of downwardly-projecting elements protruding downwardly therefrom for penetrating into the seafloor for mechanically engaging seafloor material;

said base having mounted thereon at least one elongated discharge tube;

said elongated tube having its axis "A" aimed upwardly at an acute angle β relative to said reference plane H;

said elongated tube having an open discharge mouth at its upper end;

said discharge mouth allowing water freely to enter said tube for filling said tube with water when said source is submerged into a body of water; and at least one quick-firing compressed-air discharger mounted in a lower portion of said discharge tube for blasting water upwardly through said tube and out of said open discharge mouth upon firing of said compressed-air discharger for producing a reaction impulse directed downwardly in a direction generally along said axis A for causing said base to propagate seismic shear waves into the body of the seafloor material.

8. A marine seismic shear-wave source claimed in claim 7, wherein:

said downwardly-projecting elements protruding downwardly from said base for penetrating into the seafloor are blade-like teeth mounted in spaced, parallel rows; and said blade-like teeth have face areas aligned with said rows.

9. A marine seismic shear-wave source claimed in claim 7, further comprising:

at least one pneumatic thruster mounted on said base aimed outwardly from said base in an aiming direction which is substantially parallel with said reference plane H; and said pneumatic thruster is positioned away from a center of said base for changing azimuthal orientation of said base by actuating said pneumatic thruster.

10. A marine seismic shear-wave source claimed in claim 9, further comprising:

a lifting sling connected to said base for lifting said source;

said lifting sling being connected to a swivel; and said swivel facilitating changing enabling azimuthal orientation of said base when said lifting sling is supporting said base away from significant engagement with the seafloor material, whereby actuating said pneumatic thruster changes the azimuthal orientation of said base while said lifting sling is supporting said base away from significant engagement with seafloor material.

11. A marine seismic shear-wave source claimed in claim 9, wherein:

said downwardly projecting elements protruding downwardly from said base are a multiplicity of blade-like teeth;

said blade-like teeth are mounted in spaced, parallel rows;

said blade-like teeth have face areas oriented generally parallel with said rows; and said pneumatic thruster is aimed in a direction generally parallel with face areas of said blade-like teeth.

12. A marine seismic shear-wave source claimed in claim 10 wherein:

said downwardly projecting elements protruding downwardly from said base are a multiplicity of blade-like teeth;

said blade-like teeth are mounted in spaced, parallel rows;

the blade-like teeth have face areas oriented generally parallel with said rows;

a pair of pneumatic thrusters are mounted on said base;

said pneumatic thrusters are positioned substantially equal distances away from a center of said base; and said pneumatic thrusters are aimed outwardly in opposite aiming directions from said base for applying a rotational torque to said base acting around said center for changing azimuthal orientation of said base upon simultaneously actuating said pair of pneumatic thrusters while said lifting sling is supporting said base away from significant engagement with seafloor material.

13. A marine seismic shear-wave source claimed in claim 7, wherein:

said base is rectangular;

said base has a length in a range between about 130 inches (about 330 cm) and about 150 inches (about 380 cm);

said base has a width in a range between about 90 inches (about 230 cm) and about 100 inches (about 250 cm); and said base has a multiplicity of anti-kiting apertures therein for allowing water to flow upwardly through said base while said base is being lowered through a body of water.

14. A marine seismic shear-wave source claimed in claim 7, wherein:

said tube has an axial length "L" in a range between about 70 inches (about 175 cms) and about 105 inches (about 270 cms);

said tube has an inner diameter "D" in a range between about 12 inches (about 30 cm) and about 24 inches (about 60 cm); and said compressed-air discharger is a marine seismic airgun having a firing chamber volume in a range between about 100 cubic inches (about 1,635 cubic cms) and about 400 cubic inches (about 6,550 cubic cms).

15. A marine seismic shear-wave source claimed in claim 14, wherein:

said acute angle β is in a range between about 30° and about 60°.

16. A marine seismic shear-wave source comprising:

a base for positioning down onto a seafloor;

said base defining a reference plane "H";

said base having a plurality of downwardly-projecting elements protruding downwardly therefrom for penetrating into the seafloor for mechanically engaging seafloor material;

said base having a centerline "CL" extending upwardly perpendicular to said reference plane H;

said baser having mounted thereon first and second elongated discharge tubes of similar length "L" and similar inside diameter "D";

said first and second tubes being symmetrically positioned on opposite sides of said centerline CL;

said first and second tubes having axes "A";

said centerline CL and said axes A all being in a common vertical plane oriented perpendicular to said reference plane H;

said axes A being oriented at equal acute angles "β" relative to said reference plane H;

said acute angle β being in a range between about 30° and about 60°;

downward extensions of said axes A meeting at a point "O" on said reference plane H;

said axes A diverging upwardly from said centerline CL;

said first and second tubes having open mouths at their upper ends allowing water to fill said first and second tubes when the shear-wave source is submerged in a body of water;

said first and second tubes having first and second marine seismic airguns respectively mounted therein in lower portions of the first and second tubes for blasting water upwardly through said first tube and out of its open mouth upon firing of said first airgun and for blasting water upwardly through said second tube and out of its open mouth upon firing of said second airgun, whereby firing of said first airgun produces a first reaction impulse directed downwardly in a direction generally along the axis A of the first tube for applying to the seafloor a first horizontal force component of the first reaction impulse acting in a first direction, thereby generating and propagating into the body of the seafloor SH-Waves and SV-Waves of first predetermined polarities, and whereby firing of said second airgun produces a second reaction impulse directed downwardly in a direction generally along the axis A of the second tube for applying to the seafloor a second horizontal force component of the second reaction impulse acting in a second direction opposite to said first direction, thereby generating and propagating into the body of the seafloor SH-Waves and SV-Waves of second predetermined polarities each respectively opposite to said first predetermined polarities.

17. A marine seismic shear-wave source claimed in claim 16, wherein:

said acute angles β are about 45°.

18. A marine seismic shear-wave source claimed in claim 16, wherein:

said plurality of downwardly-projecting elements have surface areas oriented in spaced, parallel relationship; and said surface areas are oriented generally perpendicular to said common vertical plane for coupling horizontal force components to the seafloor material.

19. A marine seismic shear-wave source claimed in claim 16, wherein:

said base is rectangular having length and width; and said common vertical plane is oriented generally parallel to the length of the base.

20. A marine seismic shear-wave source claimed in claim 16, wherein:

said base has a plurality of anti-kiting apertures therein for allowing water to flow upwardly through the apertures while the base is being lowered through a body of water.

21. A marine seismic shear-wave source claimed in claim 19, wherein:

a lifting sling is connected near four corners of the rectangular base;

four pneumatic thrusters are mounted on the base respectively near the four corners;

the four pneumatic thrusters are aimed outwardly away from the base in respective aiming directions generally parallel with said horizontal reference plane H;

said aiming directions are generally perpendicular to the length of the rectangular base for changing azimuthal orientation of the base by simultaneously actuating two thrusters mounted near diagonally opposite corners of the base while the lifting sling is supporting the base substantially away from engagement with seafloor material; and the base is equipped with at least one signalling device for providing a surface vessel with signals indicating azimuthal orientation of the base.

22. A marine seismic shear-wave source claimed in claim 16, wherein:

the first and second tubes have substantially equal axial lengths "L";

the lengths L are in a range between about 70 inches (about 175 cms) and about 105 inches (about 270 cms);

the first and second tubes have substantially equal inside diameters "D"; and the diameters D are in a range between about 12 inches (about 30 cms) and about 24 inches (about 60 cms).

23. A marine seismic shear-wave source claimed in claim 22, wherein:

the first and second marine seismic airguns have substantially equal firing chamber volumes; and the firing chamber volumes are in a range between about 100 cubic inches (about 1,635 cubic cms) and about 400 cubic inches (about 6,550 cubic cms).

* * * * *